(12) United States Patent
Rappl (10) Patent No.: US 10,605,497 B2
(45) Date of Patent: Mar. 31, 2020

(54) DEVICE FOR REGULATING THE TEMPERATURE OF AT LEAST ONE OBJECT AND METHOD FOR CHECKING THE FUNCTIONAL CAPABILITY OF A SENSOR DEVICE HAVING AT LEAST TWO SENSORS

(71) Applicant: Gentherm GmbH, Odelzhausen (DE)

(72) Inventor: Alexander Rappl, Königsbrunn (DE)

(73) Assignee: GENTHERM GMBH, Odelzhausen (DE)

( * ) Notice: Subject to any disclaimer, the term of this patent is extended or adjusted under 35 U.S.C. 154(b) by 270 days.

(21) Appl. No.: 15/440,095

(22) Filed: Feb. 23, 2017

(65) Prior Publication Data

US 2017/0248351 A1 Aug. 31, 2017

(30) Foreign Application Priority Data

Feb. 26, 2016 (DE) .......... 10 2016 002 245

(51) Int. Cl.
*F25B 21/04* (2006.01)
*G05D 23/19* (2006.01)
*G01K 15/00* (2006.01)

(52) U.S. Cl.
CPC ............ *F25B 21/04* (2013.01); *G01K 15/007* (2013.01); *G05D 23/1919* (2013.01); *G05D 23/1931* (2013.01); *F25B 2700/2107* (2013.01)

(58) Field of Classification Search
CPC ...... F25B 21/04; F25B 21/02; F25B 2321/02; F25B 2700/2107; G05D 23/1927; G05D 23/1928
See application file for complete search history.

(56) References Cited

U.S. PATENT DOCUMENTS 5,237,142 A 8/1993 Cigarini et al.
5,927,078 A 7/1999 Watanabe et al.
(Continued)

FOREIGN PATENT DOCUMENTS

CN 2152805 Y 1/1994
CN 1182864 A 5/1998
(Continued)

OTHER PUBLICATIONS

Japanese Office Action for Japanese Patent Application No. 2017-033830, dated Dec. 19, 2017.
(Continued)

*Primary Examiner* — Brian M King
(74) *Attorney, Agent, or Firm* — The Dobrusin Law Firm, P.C.

(57) ABSTRACT

A device for regulating a temperature of at least one object. The device includes a thermoelectric element for release of heating and/or cooling energy to the object. The device includes a processor unit, which is coupled for regulation to the thermoelectric element. The device includes a sensor device, Which has at least one sensor for detecting a de facto temperature trending in an area of the thermoelectric element; and at least one additional sensor configured as a component of the processor unit for detecting a de facto temperature trending in an area of the processor unit. The processor unit is connected with the sensor device, and is configured for comparison of the detected de facto temperatures, and while allowing for the comparison, the processor unit can derive an assessment of a functional capability of the sensor device.

19 Claims, 4 Drawing Sheets

(56) References Cited

U.S. PATENT DOCUMENTS

| | | |
|---|---|---|
| 2003/0133492 A1 | 7/2003 | Watanabe |
| 2003/0226363 A1 | 12/2003 | Lee et al. |
| 2004/0140304 A1 | 7/2004 | Leyendecker |
| 2005/0138935 A1 | 6/2005 | Shin et al. |
| 2009/0084119 A1 | 4/2009 | Lifson et al. |
| 2013/0319016 A1* | 12/2013 | Fontanel ................ F01D 25/12 62/3.61 |

FOREIGN PATENT DOCUMENTS

| | | | |
|---|---|---|---|
| CN | 101283243 | A | 10/2008 |
| CN | 202869689 | U | 4/2013 |
| DE | 4017475 | A1 | 12/1991 |
| DE | 69107631 | T2 | 10/1995 |
| DE | 102004035014 | A1 | 2/2006 |
| DE | 102007019093 | A1 | 11/2008 |
| DE | 102014005574 | A1 | 11/2014 |
| JP | S56-150888 | A | 11/1981 |
| JP | S5854712 | U | 4/1983 |
| JP | H05-080861 | A | 4/1993 |
| JP | 2003-208231 | A | 7/2003 |
| JP | 2009-257722 | A | 11/2009 |
| JP | 2011-138232 | A | 7/2011 |
| KR | 2003-0094883 | A | 12/2003 |

OTHER PUBLICATIONS

First Office Action for Chinese Patent Application No. 201710275550.8 dated Aug. 22, 2018.
Notification of Reason for Refusal for Korean Application No. 10-2017-0024823 dated May 9, 2018.

\* cited by examiner

DEVICE FOR REGULATING THE TEMPERATURE OF AT LEAST ONE OBJECT AND METHOD FOR CHECKING THE FUNCTIONAL CAPABILITY OF A SENSOR DEVICE HAVING AT LEAST TWO SENSORS

FIELD

The present invention relates to a device for regulating the temperature of at least one object and a method for checking the functional capability of a sensor device having at least two sensors.

RELATED APPLICATIONS

This application claims priority to DE 10 2016 002 245.0, filed on Feb. 26, 2016, the entire disclosure of which is hereby incorporated by reference herein for all purposes.

BACKGROUND

In order to regulate a temperature relating to a device and/or to monitor the temperature of an object to be temperature-regulated, which is linked with the device for temperature regulation, or also to be able to set a desired temperature for regulating the temperature of the object, devices known from prior art are equipped with temperature sensors.

On the one hand, the temperature sensors can detect temperature values of the object to be temperature-regulated, or also detect temperature values which affect the device for temperature regulation itself, for example to provide timely detection of an undesired overheating or deficient heating, and/or cooling performance of the device for temperature regulation. True, in an arrangement of a single temperature sensor for detecting temperature values relating to the device for temperature regulation and/or the object whose temperature is to be related, there is a risk that a defective or improperly functioning temperature sensor will not be recognized, so that the device for temperature regulation of the object to be regulated possibly might not operate as prescribed, or even cause damage to the object to be temperature-regulated, due to inappropriate temperature regulation.

To minimize these risks, devices for temperature regulation are already known which have two temperature sensors, to detect temperature values of an object whose temperature is to be regulated and/or of the device for temperature regulation. Here, if one temperature sensor for detection of temperature values fails, it is possible to have recourse to the other sensor. With this way of configuring the device for temperature regulation with two temperature sensors, one must count on increased material costs, since the use of an additional temperature sensor involves additional costs.

SUMMARY

Thus, it is the object of the invention to provide a device for regulating the temperature of at least one object, which at least in part avoids the above-named drawbacks of the prior art. In addition, a device for regulating the temperature of at least one object is provided, by means of which the operational and functional safety of the device is increased and manufacturing costs can be saved.

The above objects are achieved by a device for regulating the temperature of at least one object, as well as a method for checking the functional capability of a sensor device consisting of at least two sensors, which comprise the features of patent claims 1 and 9. Additional advantageous embodiments are described in the subordinate claims.

A device for regulating a temperature of at least one object, the device comprising a thermoelectric element for release of heating and/or cooling energy to the object; a processor unit, which is coupled to thermoelectric element for regulation of the thermoelectric element; and a sensor device. The sensor device has at least one sensor for detecting a de facto temperature trending in an area of the thermoelectric element; and at least one additional sensor configured as a component of the processor unit for detecting, a de facto temperature trending in an area of the processor unit. The processor unit is connected with the sensor device, and is configured for comparison of the detected de facto temperatures. While allowing for the comparison, the processor unit can derive an assessment of a functional capability of the sensor device.

A method for checking a functional capability of a sensor device having at least two sensors, the method comprising steps of: detecting a de facto temperature trending in an area of a thermoelectric element via at least one sensor of the sensor device; detecting a de facto temperature trending in the area of a processor unit coupled with the thermoelectric element, via at least one additional sensor of the sensor device, the additional sensor is configured as a component of the processor unit; comparing the de facto temperatures determined via the at least one sensor and the at least one additional sensor; and, making an assessment of the functional capability of the sensor device by means of the comparison.

A device for regulating a temperature of an object, the device comprising a thermoelectric element that is a Peltier element for release of heating and/or cooling energy to the object; a processor unit coupled to the thermoelectric element for regulation to the thermoelectric element; and a sensor device. The sensor device has at least one sensor for detecting a de facto temperature trending in an area of the thermoelectric element; and at least one additional sensor configured as a component of the processor unit for detecting a de facto temperature trending in an area of the processor unit. The processor unit is connected with the sensor device, and is configured to compare the detected de facto temperatures. The processor unit confirms the sensor device to be functionally capable if the de facto temperatures are trending identically. The processor unit assesses a malfunction of the sensor device if the de facto temperatures diverge from each other, or diverge from each other within a certain range. The processor unit is configured to check the thermoelectric element for a Seebeck voltage. If the Seebeck voltage is present, the processor unit halts the comparison of the detected de facto temperatures, and if the Seebeck voltage is not present, the processor unit carries out the comparison of the detected de facto temperatures. The thermoelectric element, the processor unit, and the sensor device are accommodated in a joint housing.

An invention-specific device for regulating the temperature of at least one object comprises a thermoelectric element for release of heating and/or cooling energy to the particular object. The thermoelectric element can especially be a Peltier element. For regulation of the thermoelectric element, a processor unit is coupled to the thermoelectric element. Additionally the device for regulating the temperature of at least one object comprises a sensor device, which has at least one sensor for detecting a de factor temperature in the area of the thermoelectric element, and at least one additional sensor configured as a component of the processor unit for detecting a de facto temperature in the area of the processor unit. With this, the processor unit is connected with the sensor device. Additionally, the processor unit is configured for comparison of the trending de facto temperature by means of the at least one sensor for detection of a thermoelectric unit and the trending de facto temperature by means of the at least one additional sensor for detection in the area of the processor unit. While allowing for the comparison, the processor unit is in a position to assess the functional capability of the sensor device. With this, it may be that the processor unit confirms the sensor device to be functionally capable, if the de facto temperatures are trending identically, or at least approximately identically. Additionally, it may be that the processor unit assesses a malfunction of the sensor device, if the de facto temperatures diverge from each other, or diverge from each other within a certain range.

According to the present invention, the at least one additional sensor for detection of the de facto temperature trending in the area of the processor unit is configured as a component of the processor unit. It is standard procedure for many processor units to comprise an integrated sensor for detection of a de facto temperature, so that this sensor ideally can be suitable as an additional sensor for the detection of the de facto temperature trending in the area of the processor unit. These additional sensors integrated in the processor units can in many cases be configured to detect a temperature in a range from about −40° C. to +50° C. In many cases, the at least one additional sensor for detection of the de facto temperature trending in the area of the processor unit is not directly attached to the processor unit, wherein the at least one additional sensor nonetheless is a component of the processor unit. In especially preferred instances, the at least one additional sensor is however configured to detect the de facto temperature of the processor unit and to monitor the temperature of the processor unit.

According to one embodiment of the invention-specific device for regulating the temperature of at least one object, the processor unit can check for a Seebeck voltage of the thermoelectric element. Additionally, the processor unit can be so configured that if a Seebeck voltage is present, it stops comparing the detected de facto temperatures, and permits a comparison of the detected de facto temperatures if a Seebeck voltage is not present. What customarily is designated as a Seebeck voltage is an electrical voltage which arises in a circuit from two different electrical conductors of a thermoelectric element with a temperature difference between contact points of the two electrical conductors. With the thermoelectric element of the invention-specific device for regulating the temperature of at least one object, a temperature difference therefore of the two lateral surfaces of the thermoelectric element is especially relevant, due to which temperature difference a voltage can be produced. A thermoelectric element customarily has two lateral surfaces in the form of a first wide surface and a second wide surface. The first wide surface is provided to emit heating and/or cooling energy to a particular object, and therefore can be designated as the effective surface. Additionally, on a wide surface of the thermoelectric element or of the Peltier element, a means can adjoin for cooling of the thermoelectric element or of the Peltier element. This wide surface especially can be the second wide surface or the waste heat side of the thermoelectric element or of the Peltier element, which is provided to release waste heat. Thus, no Seebeck voltage or a detected Seebeck voltage of 0 volts or at least approximately 0 volts of the thermoelectric element means that there is no temperature difference between the first and second wide surfaces of the thermoelectric element, or that the temperatures on the first and second wide surfaces at least approximately exhibit an equal value. Due to the possibility to check the thermoelectric element for a Seebeck voltage, it is possible to freely position the at least one sensor for detection of a de facto temperature trending in the area of the thermoelectric element relative to the thermoelectric element, since if no Seebeck voltage is present, there is no temperature difference between the first and second wide surface of the thermoelectric element.

In practice, embodiments have proven effective in which the thermoelectric element, the processor unit and the sensor device are accommodated in a joint housing. Ideally the thermoelectric element, the processor unit and the sensor unit can be situated within the joint housing. By this means, employing the comparison of the detected de facto temperature, in an ideal manner, a reliable assessment can be made of the functional capability of the sensor device. By situating the thermoelectric element, the processor unit and the sensor device within one housing, provision can be made for unitary environmental conditions for the thermoelectric element, the processor unit and the sensor device, and the thermoelectric element, the processor unit and the sensor device can be protected from exterior environmental effects.

Additionally, instructions can be placed on the processor unit that result in a comparison of the detected de facto temperatures when the processor unit is placed in operation, or immediately thereafter. By this means it can be avoided that the additional sensor is heated due to an intrinsic temperature of the processor unit, thereby influencing the comparison. It can likewise be appropriate to detect the particular de facto temperature in the area of the thermoelectric element by means of the at least one sensor before, during or immediately after placing the thermoelectric, element in operation, to counteract a de facto temperature influenced by an intrinsic heating of the thermoelectric element.

According to the present invention, a usage of an invention-specific device with the features previously described can be provided for cooling of at least one storage battery. Additionally, it is conceivable to use an invention-specific device with the features previously described, in which the thermoelectric element is configured to emit heating and/or cooling energy to a container for drinks.

An additional component of the invention relates to a method for checking the functional capability of a sensor device having at least two sensors. Features which previously were described for the device can also be provided with conceivable embodiments of the method. In addition, the features named as follows, which relate to various embodiments of the method, can be provided with the device described above, and therefore are not mentioned, which would be redundant. For this, the method comprises the following steps:

detection of a de facto temperature trending in the area of the thermoelectric element via at least one sensor of the sensor device     detection of a de facto temperature trending in the area of a processor unit coupled with the thermoelectric unit via at least one additional sensor of the sensor device, which additional sensor is configured as a component of the processor unit     comparison of the de facto temperatures determined via the at least one sensor and the at least one additional sensor making an assessment of the functional capability of the sensor device by means of the comparison.

In this it has been proven to be advantageous, if the de facto temperature trending in the area of the thermoelectric element is detected via the at least one sensor before, during or immediately after the thermoelectric element is placed, in operation, since the de facto temperature which is trending in the area of the thermoelectric element, as already described in connection with the invention-specific device for regulating the temperature of at least one object, is able to be influenced by an intrinsic heating of the thermoelectric element during operation and/or by release of heat from the processor unit.

Likewise, it makes sense if the de facto temperature trending in the area of the processor unit is detected via the at least one additional sensor, during or immediately after the processor unit is placed in operation, to prevent the de facto temperature trending in the area of the processor unit from being affected by an intrinsic heating of the processor unit during operation. Through a comparison of the de facto temperatures detected under unitary environmental conditions, by means of the at least one sensor, as well as the at least one additional sensor, it can be ensured that the de facto temperatures trending in the areas of the thermoelectric element and of the processor unit are close to identical, at least within a defined range.

Additionally, a Seebeck voltage of the thermoelectric element can be checked. Ideally the processor unit carries out the detection of the Seebeck voltage generated by the thermoelectric element if no Seebeck voltage develops, a comparison is done of the detected de facto voltages. If a Seebeck voltage develops, the de facto temperature detection by the at least one sensor and the at least one additional sensor is stopped. As already described, a Seebeck voltage is a voltage which arises with a temperature difference between a first wide surface and a second wide surface of the thermoelectric element. Thus, no Seebeck voltage or a detected Seebeck voltage of 0 volts or at least approximately 0 volts of the thermoelectric element means that there is no temperature difference between the first and second wide surfaces of the thermoelectric element, or that the temperatures on the first and second wide surfaces at least approximately exhibit an equal value, Depending on a Seebeck voltage of the thermoelectric element not forming, a comparison can thus be conducted of the de facto temperature detected by the at least one sensor in the area of the thermoelectric element and of the de facto temperature detected by the at least one additional sensor in the area of the processor unit. It is required that a Seebeck voltage not appear for equal, or at least approximately equal temperatures to be present on the first and second wide surfaces of the thermoelectric element, and no temperature difference to exist.

Consequently it can be concluded that the sensor device comprising the at least one sensor for detection of the de facto temperature trending in the area of the thermoelectric element and the at least one additional sensor for detection of the de facto temperature in the area of the processor unit is functionally capable, if the detected de facto temperatures which are trending in the area of the thermoelectric element and the processor element, at least approximately exhibit an identical value. It can be appropriate for ensuring that the sensor unit is functionally capable for a longer term that the de facto temperatures in the area of the thermoelectric element and in the area of the processor element be compared at fixed intervals and repeated.

In what follows, embodiments of the invention and their advantages are explained in greater detail using the appended figures. The size relationships to each other of the individual elements in the figures do not always correspond to the actual size relationships, because some forms are simplified and other forms are enlarged in relation to other elements for improved visibility. Identical reference symbols are used for elements of the invention that are identical or that function identically. Additionally, for the sake of better visibility, in the individual figures only those reference symbols are shown that are required for the particular figure. The embodiments depicted are only examples of how the invention-specific device and the invention-specific method can be configured, and do not represent any definitive limitation.

DETAILED DESCRIPTION

Figure 1:
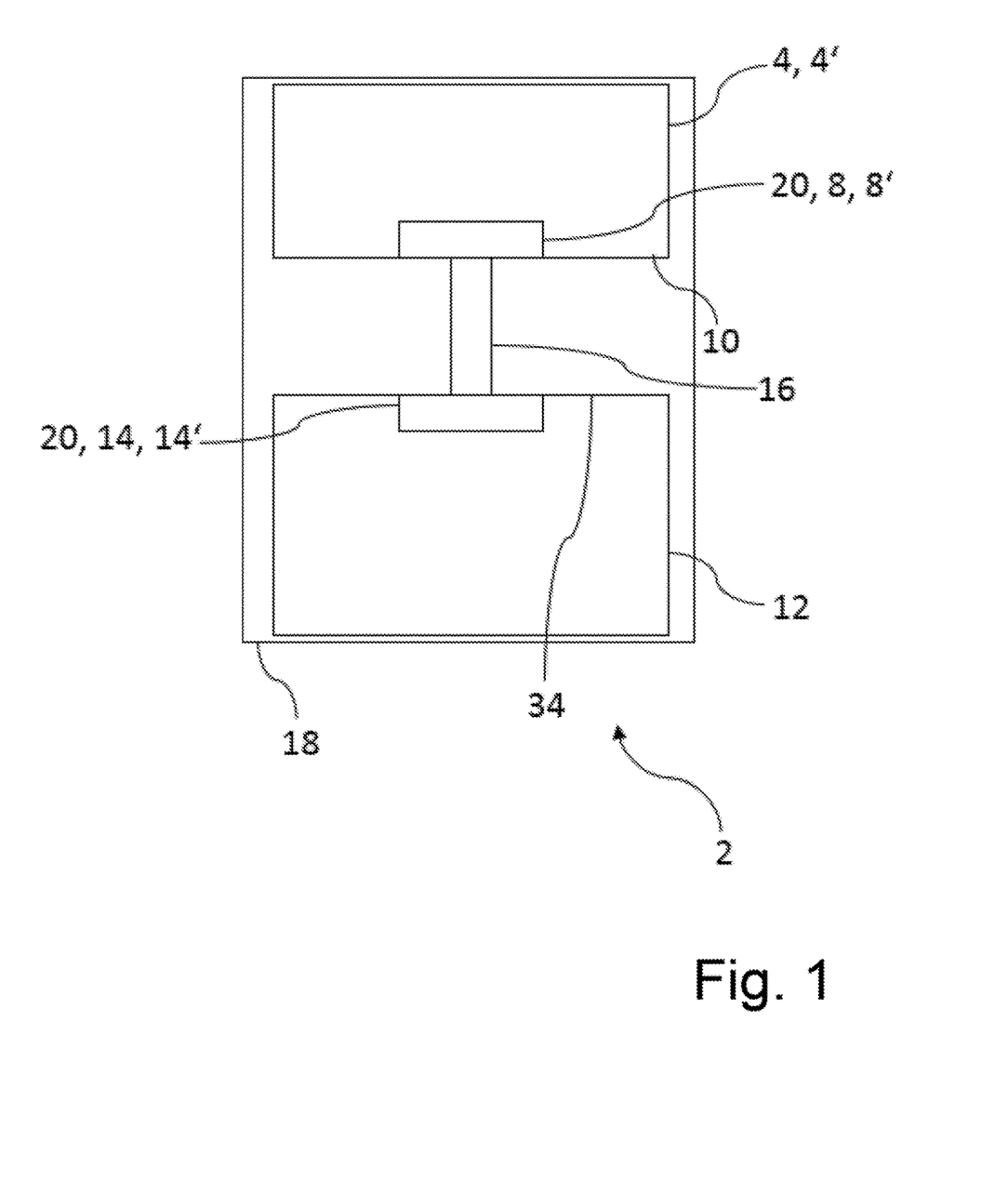
FIG. 1 is a schematic view of an embodiment of an invention-specific device for regulating the temperature of at least one object.
Figure 2:
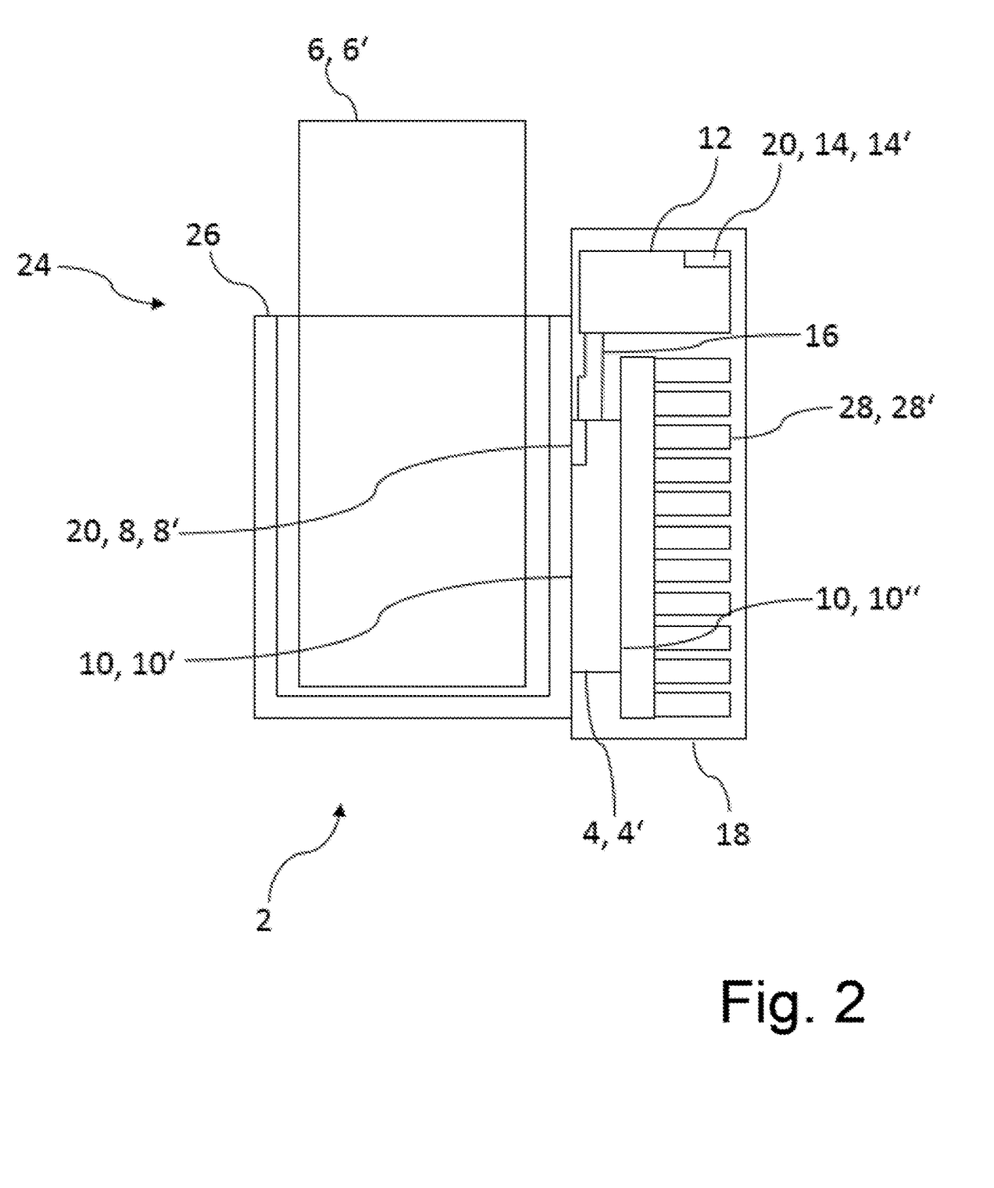
FIG. 2 is a schematic view of an additional embodiment of an invention-specific device for regulating the temperature of at least one object.

FIG. 1 shows an embodiment of an invention-specific device 2 for regulating the temperature of at least one object 6 (see FIG. 2). The device 2 for regulating the temperature of the at least one object 6 comprises a thermoelectric element 4, which is configured as a Peltier element 4'. As an additional component, device 2 comprises a processor unit 12, which is coupled to thermoelectric element 4. Processor unit 12 is provided to control and/or monitor thermoelectric element 4.

Processor unit 12 is coupled with sensor 8, as can be seen by means of the connection depicted by reference to number 16. Additionally, device 2 comprises a sensor device 20. Sensor device 20 has at least one sensor 8 for detection of a de facto temperature in the area of thermoelectric element 4. Ideally, as sensor 8 Negative Temperature Coefficient sensor, called NTC sensor 8' for short, is used. In this embodiment, sensor 8 is situated on a wide lateral surface 10 of thermoelectric element 4. Additionally, at least one more sensor 14 is provided for detection of a de facto temperature in the area of processor unit 12. Additional sensor 14 is configured as a component of processor unit 12. Additional sensor 14 can especially be a negative temperature coefficient sensor 14', which is integrated into processor unit 12. Processor unit 12 is in connection with sensor unit 20. Likewise, a connection 16 is provided for it. Thermoelectric element 4, processor unit 12 and sensor device 20 are enclosed by a housing 18 or accommodated by a housing 18. By placement in a common housing 18, provision can be made for unitary environmental conditions for thermoelectric element 4, processor unit 12 and sensor device 20, and thermoelectric element 4, processor unit 12 and sensor device 20 can be protected from exterior environmental effects. Processor unit 12 is provided for comparison of de facto temperatures detected by sensors 8 and 14, which are trending in the area of thermoelectric element 4 and processor unit 12. Additionally, which considering the comparison of the detected de facto temperatures, processor unit 12 can make an assessment of the functional capability of sensor unit 20. Processor unit 12 is configured to check thermoelectric element 4 for a Seebeck voltage. If a Seebeck voltage is present, processor unit 12 halts a comparison of the detected de facto temperatures; if no Seebeck voltage is present, processor unit 12 can carry out a comparison.

FIG. 2 shows another embodiment of an invention-specific device 2 for regulating the temperature of at least one object 6. Thermoelectric element 4 of device 2 is provided here to emit heating and/or cooling energy to a container for drinks 24 that can be thermally regulated. Drink container 24 capable of thermal regulation has an acceptor unit 26 in which an object 6, for example in the form of a drink holder 6', can be admitted for temperature regulation. Thermoelectric element 4 is coupled with acceptor unit 26. A wide lateral surface 10 of thermoelectric element 4, which adjoins acceptor unit 26, can be designated as the effective side 10' of thermoelectric element 4, since on effective side 10', heating and/or cooling energy is emitted to particular object 6. An additional wide lateral surface 10 of thermoelectric element 4, to which a means for cooling 28 of thermoelectric element 4 in the form of a cooling body 28' is coupled, can be designated as the waste heat side 10" of thermoelectric element 4. In addition, device 2 has a sensor device 20, which comprises a sensor 8 for detection of a de facto temperature trending in the area of thermoelectric element 4 and an additional sensor 14 configured as a component of processor unit 12 for detection of a de facto temperature in the area of processor 12. Sensor 8 is situated on the effective side 10' of thermoelectric element 4, to additionally be able to detect the de facto temperature in the area of object 6. Processor unit 12 is coupled with thermoelectric element 4 and is in connection with sensor device 20, as is shown by reference symbol 16. Thermoelectric element 4, processor unit 12 and sensor device 20 are situated in a common housing 18. Also, the means 28 for cooling can be in housing 18. Processor unit 12 is provided for comparison of de facto temperatures detected by sensors 8 and 14, which are configured in the area of thermoelectric element 4 and processor unit 12. Using processor unit 12, through the comparison of de facto temperatures, an assessment on the functional capability of sensor device 20 can be derived.

Figure 3:
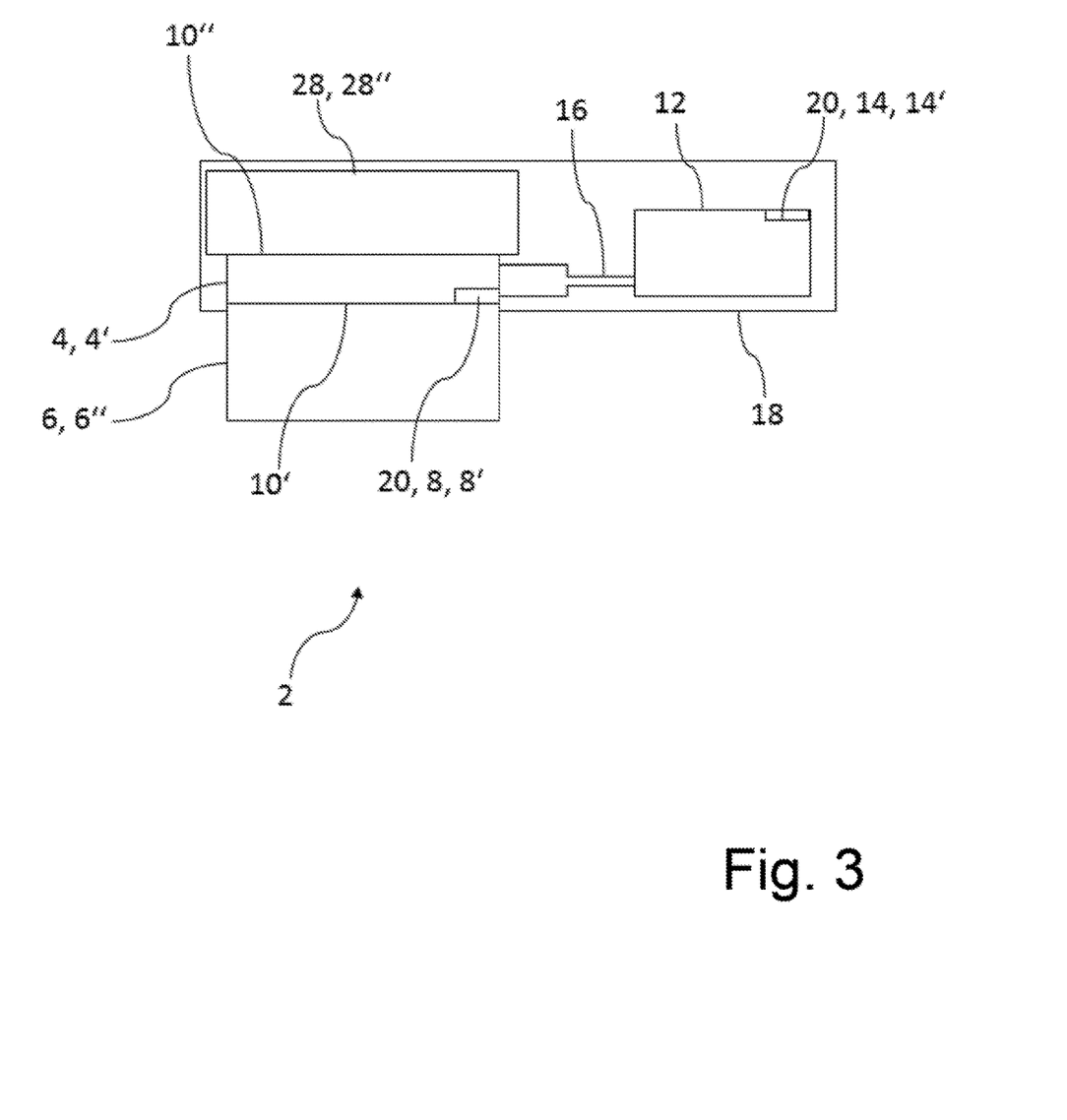
FIG. 3 is a schematic view of an additional embodiment of an invention-specific device for regulating the temperature of at least one object.

FIG. 3 discloses an additional embodiment of an invention-specific device 2 for regulating the temperature of at least one object 6. In this, thermoelectric element 4 of device 2 is provided for regulating the temperature of a storage battery 6". Thermoelectric element 4 with the effective side 10' adjoins storage battery 6", by the waste heat side 10", thermoelectric element 4 is coupled with a means 28 for cooling, for example in the form of a coolant circuit 28". For regulating and/or monitoring of thermoelectric element 4, device 2 has processor unit 12, which is coupled with thermoelectric element 4. Device 2 additionally has a sensor device 20, which comprises a sensor 8 for detecting a de facto temperature trending in the area of thermoelectric element 4, as well as an additional sensor 14 configured as a component of processor unit 12, for detection of a de facto temperature trending in the area of processor unit 12. Sensor 8 is situated in the area of the effective side 10 of thermoelectric element 4. Processor unit 12 is connected with sensor unit 20. Thermoelectric element 4, processor unit 12 and sensor device 20 are situated in a common housing 18. Also, the means 28 for cooling is in housing 18. Additionally, by means of processor unit 12, it is possible to compare the de facto temperatures detected by sensors 8 and 14, which are configured in the area of thermoelectric element 4 and processor unit 12, Using processor unit 12, through the comparison, an assessment on the functional capability of sensor device 20 can be derived.

Figure 4:
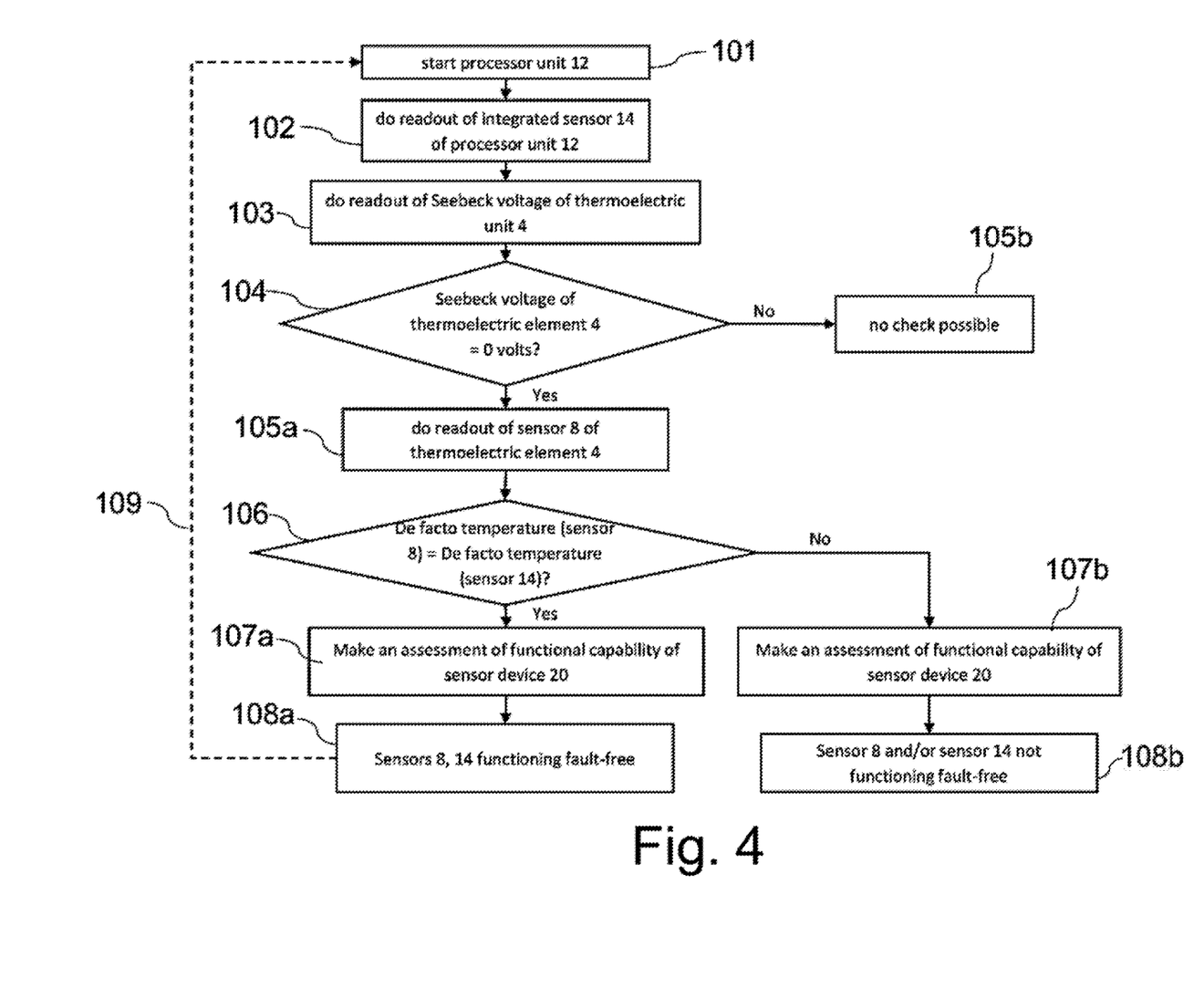
FIG. 4 is a flow chart for a conceivable embodiment of an invention-specific method for checking the functional capability of a sensor device having at least two sensors.

FIG. 4 shows a flow chart of an embodiment of an invention-specific method for checking the functional capability of a sensor device 20 consisting of at least two sensors 8, 14. In a first step 101 of the method, processor unit 12 is started or placed in operation, and immediately following a de facto temperature is detected (step 102) of a sensor 14 configured as a component of processor unit 12. Doing a readout of the one additional sensor 14 immediately after startup of processor unit 12 yields an advantage in that the particular de facto temperature detected via sensor 14 is not influenced by intrinsic warming of processor unit 12, or not substantially.

In the following step 103, a Seebeck voltage of thermoelectric element 4 is checked. The check can be done via processing unit 12. If no Seebeck voltage of thermoelectric element 4 forms, or if a Seebeck voltage is determined with a value of 0 volts or at least approximately 0 volts, the procedure can be continued (step 104).

With this in step (105a), sensor 8 for detection of the de facto temperature trending in the area of thermoelectric element 4 is read out using processor unit 12. Ideally, sensor 8 is read out during or immediately after starting thermoelectric element 4, to avoid influencing the de facto temperature which is trending, in the area of thermoelectric element 4, due to intrinsic heating of thermoelectric element 4 during operation and/or through a release of heat of processor unit 12. If, according to step 104, the Seebeck voltage of thermoelectric element 4 yields a value other than 0 volts or at least approximately 0 volts, it is not possible to check sensor device 20 for functional capability (step 105b).

After readout of sensor 8 of thermoelectric element 4, as per step 106 a comparison is made of the de facto temperature detected by sensor 8, which is trending in the area of thermoelectric element 4, and the de facto temperature detected by additional sensor 14, which is trending in the area of processor unit 12. Hereupon an assessment is made of the functional capability of sensor device 20 (steps 107a and 107b). If the de facto temperatures detected by sensors 8 and 14 manifest differing values, then as per step 108b, sensor device 20 is found to be non-functional. Consequently, one of sensors 8 and 14 is not functioning in fault-free fashion. If, in a defined range, the de facto temperatures detected by sensors 8 and 14 have a nearly identical value when compared in step 106, then it can be concluded that sensors 8 and 14 of sensor device 20 are functionally capable or fault-free. Ideally, the de facto temperatures trending in the area of thermoelectric element 4 and of processor element 12 can be compared at repeated fixed intervals (step 109).

LIST OF REFERENCE SYMBOLS

2 Device for regulating the temperature of at least one object
4, 4' Thermoelectric element, Peltier element
6, 6', 6" Object, container for drinks, storage battery
8, 8' Sensor, negative temperature coefficient sensor
10, 10', 10" Wide lateral surface, effective side, waste heat side
12 Processor unit
14, 14' Additional sensor, additional negative temperature coefficient sensor 16 Coupling
18 Housing
20 Sensor unit
24 Drink holder capable of being temperature regulated
26 Acceptor unit
28, 28', 28" Means for cooling, cooling body, coolant circuit
101 Step 1
102 Step 2
103 Step 3
104 Step 4
105a, 105b Step 5
106 Step 6
107 Step 7
108a, 108 Step 8
109 Step 9

The invention claimed is:

1. A device for regulating a temperature of an object, the device comprising:
   a thermoelectric element configured for heating and/or cooling the object;
   a processor, which is coupled to the thermoelectric element, configured for regulation of the thermoelectric element; and
   a sensor device, which has:
   a) at least one sensor configured for detecting a temperature trending in an area of the thermoelectric element; and
   b) at least one additional sensor configured for detecting a temperature trending in an area of the processor,
   wherein the processor is configured to perform a comparison of the temperature trending in the area of the thermoelectric element and the temperature trending in the area of the processor and to make an assessment of a functional capability of the sensor device based on the comparison,
   wherein the processor is configured to confirm the sensor device to be functionally capable if the temperature trending in the area of the thermoelectricc element and the temperature trending in the area of the processor are trending identically, and
   wherein the processor is configured to assess a malfunction of the sensor device if the temperatures trending in the area of the thermoelectric element and the temperature trending in the area of the processor diverge from each other or diverge from each other within a certain range.

2. The device of claim 1, wherein the processor is configured to check the thermoelectric element for a Seebeck voltage, and
   if the Seebeck voltage is present, the processor halts the comparison of the temperature trending in the area of the thermoelectric element and the termperature trending in the area of the processor, and if the Seebeck voltage is not present, the processor performs the comparison.

3. The device of claim 1, wherein instructions are placed on the processor, which result in the comparison when the processor is placed in operation or immediately thereafter.

4. The device of claim 1, wherein the thermoelectric element is a Peltier element.

5. The device of claim 4, wherein on a wide lateral surface of the Peltier element, at least one means for cooling the Peltier element adjoins.

6. The device of claim 1, wherein the thermoelectric element, the processor, and the sensor device are accommodated in a joint housing.

7. Using the device of claim 1 for regulating the temperature of at least one storage battery.

8. Using the device of claim 1, in which the thermoelectric element is configured to release a heating and/or cooling energy to a drink container.

9. The device of claim 1, wherein the at least one additional sensor is configured to detect the temperature in a range from about −40° C. to +150° C.

10. The device of claim 2, wherein the Seebeck voltage doest not occur when there is no temperature difference between a first wide surface and a second wide surface of the thermoelectric element.

11. A method for checking a functional capability of a sensor device having at least two sensors, the method comprising steps of:
    detecting a temperature trending in an area of a thermoelectric element via at least one sensor of the sensor device;
    detecting a temperature trending in the area of a processor via at least one additional sensor of the sensor device, the at least one additional sensor is configured as a component of the processor;
    comparing the temperature trending in the area of the thermoelectric element and the temperature trending in the area of the processor; and,
    making an assessment of the functional capability of the sensor device by the step of comparing.

12. The method of claim 11, wherein the temperature trending in the area of the thermoelectric element is detected via the at least one sensor before, during, or immediately after placement of the thermoelectric element into operation.

13. The method of claim 11, wherein the temperature trending in the area of the processor is detected via the at least one additional sensor during or immediately after placement of the processor into operation.

14. The method of claim 11, wherein a Seebeck voltage of the thermoelectric element is checked and if the Seebeck voltage does not form, the comparing step is carried out on the temperature trending in the area of the thermoelectric element and the temperature trending in the area of a processor, or if the Seebeck voltage forms, the comparing step is halted.

15. The method of claim 11, wherein the method comprises:
    confirming the sensor device to be functionally capable if the temperature trending in the area of the thermoelectric element and the temperature trending in the area of the processor are trending identically, and
    assessing a malfunction of the sensor device if the temperature trending in the area of the thermoelectric element and the temperature trending in the area of the processor diverge from each other or diverge from each other within a certain range.

16. A device for regulating a temperature of an object, the device comprising:
    a thermoelectric element that is a Peltier element for release of heating and/or cooling energy to the object;
    a processor coupled to the thermoelectric element for regulation of the thermoelectric element; and
    a sensor device, which has:
    a) at least one sensor for detecting a temperature trending in an area of the thermoelectric element; and b) at least one additional sensor for detecting a temperature trending in an area of the processor, wherein the processor is connected with the sensor device and is configured to compare the temperature trending in the area of the thermoelectric element and the temperature trending in the area of the processor, wherein the processor confirms the sensor device to be functionally capable if the temperature trending in the area of the thermorelectic element and the temperature trending in the area of the processor are trending identically, wherein the processor assesses a malfunction of the sensor device if the temperature trending in the area of thermorelectric element and the temperature trending in the area of the processor diverge from each other, or diverge from each other within a certain range, wherein the processor is configured to check the thermoelectric element for a Seebeck voltage, wherein if the Seebeck voltage is present, the processor halts the comparison of the temperature trending in the area of the thermoelectric element and the temperature trending in the area of the processor, and if the Seebeck voltage is not present, the processor carries out the comparison of the temperature trending in the area of the thermoelectric element and the temperature trending in the area of the processor, wherein the thermoelectric element, the processor, and the sensor device are accommodated in a joint housing.

17. The device of claim 16, wherein the temperature trending in the area of the thermoelectric element is detected via the at least one sensor before, during or immediately after the thermoelectric element is placed in operation, and wherein the temperature trending in the area of the processor is detected via the at least one additional sensor, during or immediately after the processor is placed in operation to prevent the temperature trending in the area of the processor from being affected by an intrinsic heating of the processor during operation.

18. The device of claim 17, wherein the object is a container for drinks.

19. The device of claim 17, wherein the object is a storage battery.

* * * * *